(12) United States Patent
Sonnendorfer et al.

(10) Patent No.: US 8,314,690 B2
(45) Date of Patent: Nov. 20, 2012

(54) IMMOBILIZER FOR SHOPPING CARTS

(76) Inventors: Horst Sonnendorfer, Puchheim (DE);
Franz Wieth, Puchheim (DE)

( * ) Notice: Subject to any disclaimer, the term of this patent is extended or adjusted under 35 U.S.C. 154(b) by 728 days.

(21) Appl. No.: 12/376,031

(22) PCT Filed: Aug. 2, 2006

(86) PCT No.: PCT/DE2006/001351
§ 371 (c)(1),
(2), (4) Date: Jul. 29, 2009

(87) PCT Pub. No.: WO2008/014728
PCT Pub. Date: Feb. 7, 2008

(65) Prior Publication Data
US 2009/0315691 A1 Dec. 24, 2009

(51) Int. Cl.
*B60R 25/10* (2006.01)
(52) U.S. Cl. ............. 340/426.11; 188/1.12; 280/33.994; 340/568.5; 340/686.6
(58) Field of Classification Search ............... 340/568.5, 340/686.6, 426.1, 550, 426.11, 568.1; 188/1.12, 188/111; 280/33.994; 705/1.1, 13
See application file for complete search history.

(56) References Cited

U.S. PATENT DOCUMENTS

| | | | |
|---|---|---|---|
| 4,772,880 A | | 9/1988 | Goldstein et al. |
| 5,194,844 A | * | 3/1993 | Zelda ...................... 340/426.11 |
| 5,402,106 A | * | 3/1995 | DiPaolo et al. ............ 340/568.5 |
| 5,537,182 A | | 7/1996 | Wakabayashi et al. |
| 5,801,625 A | * | 9/1998 | Wang ............................ 340/506 |
| 5,821,856 A | | 10/1998 | Lace |
| 6,502,669 B1 | | 1/2003 | Harris |
| 7,218,225 B2 | * | 5/2007 | Wieth et al. ................ 340/568.5 |
| 7,420,461 B2 | * | 9/2008 | Nebolon et al. ......... 340/426.11 |
| 7,944,368 B2 | * | 5/2011 | Carter et al. ............... 340/686.6 |
| 2005/0155824 A1 | * | 7/2005 | Taba .............................. 188/19 |

FOREIGN PATENT DOCUMENTS
DE 3700411 A1 7/1987
* cited by examiner

*Primary Examiner* — Brent Swarthout
(74) *Attorney, Agent, or Firm* — Laurence A. Greenberg; Werner H. Stemer; Ralph E. Locher

(57) ABSTRACT

To generally prevent people from being able to take out and move shopping carts from shopping cart parking areas at times when the store is not open, the blocking devices on the shopping carts are activated when the shopping carts are parked in shopping cart parking areas when the store is not open.

7 Claims, 2 Drawing Sheets

IMMOBILIZER FOR SHOPPING CARTS

BACKGROUND OF THE INVENTION

Field of the Invention

1. Technical Field

The invention relates to an immobilizer for shopping carts which prevents a shopping cart which is equipped with such an immobilizer from being used outside a permissible region.

2. Prior Art

An immobilizer of this type is known, for example, from U.S. Pat. No. 6,362,728.

In said document, at least one of the casters on the shopping cart is locked when the shopping cart leaves the permissible region.

One disadvantage of this known solution is that the available shopping carts can be moved within the permissible region even at times at which the store is not open.

The shopping carts may be taken from the parking regions and become the target of vandalism, with indiscriminate distribution of the shopping carts over the entire lot also being one of the harmless forms of vandalism.

Even this harmless form creates severe damage since the individual shopping carts which are spread around far and wide require labor-intensive collection.

In the case of shopping carts which are equipped with a deposit payment lock in addition to the immobilizer, it is already made more difficult to remove the shopping carts from the parking region since a deposit payment element has to be inserted into the deposit payment lock for each shopping cart before the shopping carts can be uncoupled, but there is still no guaranteed security against unauthorized removal of the shopping carts from the parking regions.

BRIEF SUMMARY OF THE INVENTION

Disclosure of the Invention

Technical Object

The object of the invention is, in general, to prevent the shopping carts from being able to be removed from the parking regions and moved at times at which the store is not open.

Technical Solution

The object is achieved by an apparatus which activates the immobilizers on the shopping carts when the shopping carts are parked in the parking regions outside the opening times of the store.

Advantageous Effects

This solution effectively prevents shopping carts from being removed from the parking regions.

Automated, time-controlled activation of the immobilizer, which activation is matched to the respective opening times, ensures that the shopping carts parked in the parking regions can no longer be freely moved when the store is closed.

BRIEF DESCRIPTION OF THE SEVERAL VIEWS OF THE DRAWING

Brief Description of the Drawings

Figure 1:
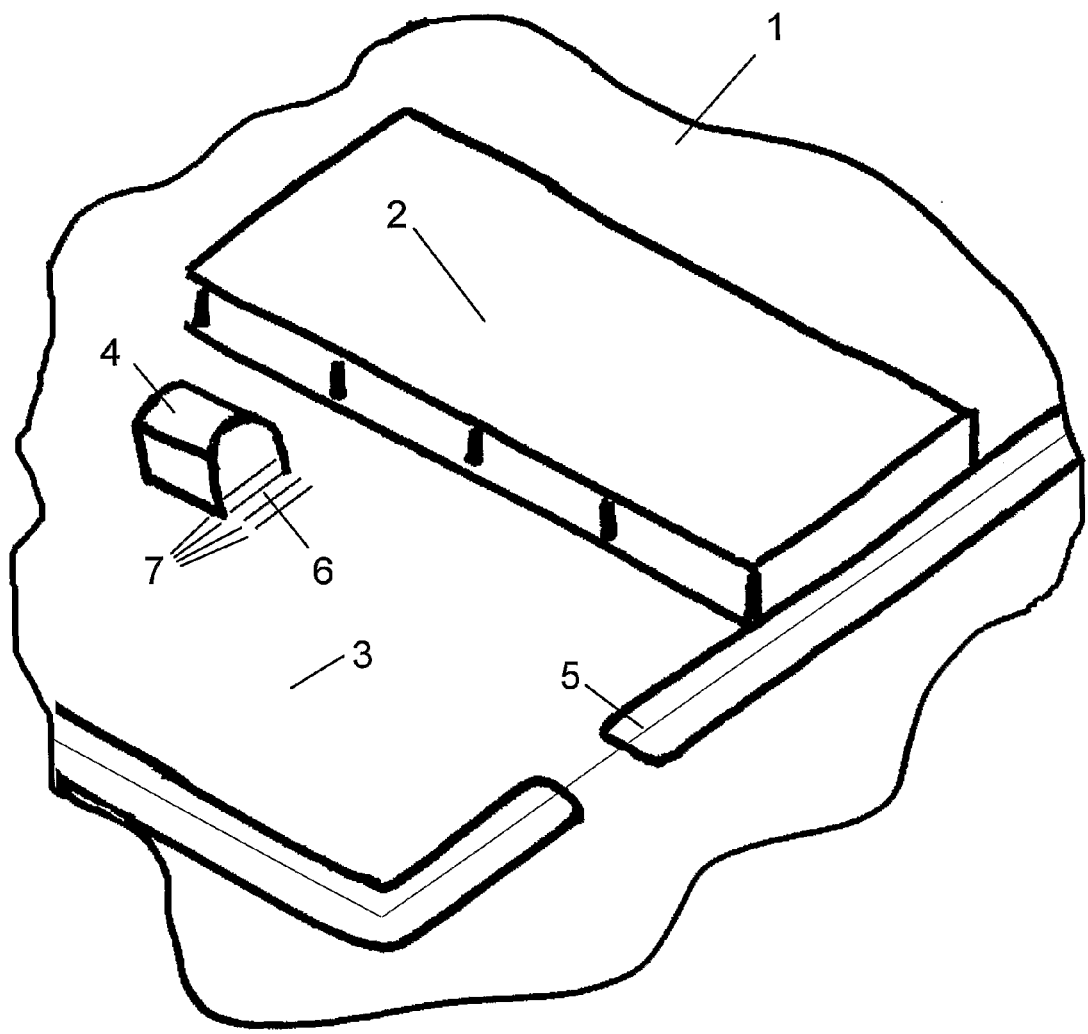
Figure 2:
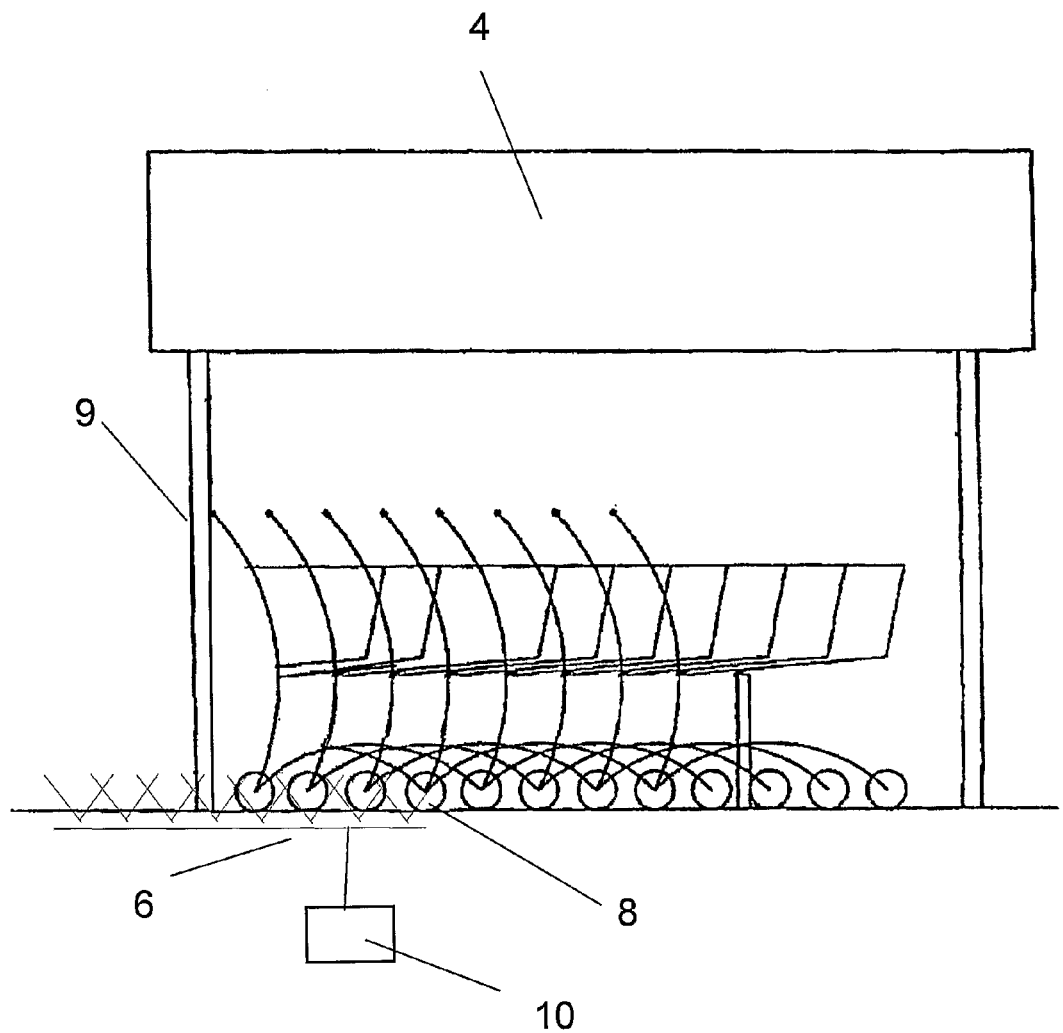

In the drawings:

FIG. 1 shows a typical area of a store with a parking lot and a parking area for shopping carts, and FIG. 2 shows a side view of the parking area together with a large number of shopping carts which are pushed one into the other.

DESCRIPTION OF THE INVENTION

The area 1 of a store which is shown in FIG. 1 comprises an outside region 3 in addition to the actual building 2. This outside region serves mainly as a parking lot and access road to the store.

Shopping carts are made available to the customers, on a deposit payment basis and for the duration of a shopping trip, in a garage 4 for shopping carts.

After the bought goods are loaded, the shopping cart is usually returned to the garage 4 by the customer in order to get the deposit payment back.

In order to prevent it being possible for the shopping carts to be used in an unintended manner outside the area 1, the area 1 is surrounded by an underground signal line 5.

The signals emitted by the signal line 5 activate the immobilizer, which is fitted to the shopping cart, in a contact-free manner as soon as the shopping cart passes over this signal line.

In many cases, this shopping cart is then abandoned and the deposit payment is left in the shopping cart.

The deposit payment which is left in the shopping cart is one of the reasons for which third parties are motivated to return the empty shopping cart, which is outside the area 1, to the garage 4 in spite of the difficulties in pushing created by the immobilizer.

When this shopping cart is returned to the garage 4, it necessarily passes a zone 6 which is at the entry to the garage.

Signal lines 7 are likewise laid underground in this zone 6.

These signal lines 7 can selectively emit a signal which can activate or deactivate the immobilizer.

FIG. 2 shows the garage 4 in which a large number of shopping carts 8 which are pushed one into the other are located.

The signal lines 7 are located beneath the carriageway in the entry region to the garage.

During the opening times of the store, the signal lines 7 transmit a signal which deactivates the immobilizer of a shopping cart, which is pushed into the garage, in a contact-free manner again if the immobilizer had previously been activated.

This has the effect that a shopping cart, of which the immobilizer was activated when it left the area 1, can again be freely moved when it is returned to the garage 4. The deposit payment is then also refunded.

Refunding of the deposit payment provides motivation for the original user who has pushed the shopping cart outside the area 1 to return this shopping cart since he has noticed that pushing the shopping cart further outside the area 1 is too much effort and he therefore decides to return the shopping cart to the garage 4.

Refunding of the deposit payment likewise provides motivation for a third party who finds a shopping cart outside the area 1 to return the shopping cart to the garage 4.

According to the invention, a signal which activates the immobilizer of the shopping carts which are in the vicinity in a contact-free manner is emitted by the signal lines 7 after the store closes for the day.

When the store is closed for the day, stochastic fluctuations can occur with regard to the number of shopping carts parked in the garage 4 and pushed one into the other.

According to the invention, the signal lines 7 are therefore arranged such that the signal transmitted by said signal lines reaches and can lock both the immobilizers of the shopping carts situated somewhat outside the garage entrance 9 and also the immobilizers of some shopping carts inside the garage 4.

As a result, the immobilizer is activated at least on some of the shopping carts parked at the end of the row, irrespective of the number of parked shopping carts.

The locked shopping carts are pushed one into the other and as a result form a connected, locked group which can only be moved together.

This is only possible with a substantially increased amount of effort and therefore provides sufficient protection against spontaneous vandalism.

In the case of such spontaneous vandalism, the perpetrators do not make any preliminary plans to bring along a corresponding tool with which the resistance of the blocked group could be overcome.

On account of the locked group, which can be moved only with difficulty, at the end of the row, the shopping carts situated further in front are also protected since these can only be reached if the locked group is passed.

The greater the number of shopping carts with a locked immobilizer, the greater is the resistance of the locked group. If the signal lines 7 run in the region of the entire garage 4, the immobilizers of all the shopping carts are locked.

In the case of the considerations which led to the creation of the present invention, account was additionally taken of the fact that the first shopping carts of a row are removed more rarely than the last shopping carts.

Consideration was likewise taken of the fact that the immobilizers are battery-operated and the time at which battery replacement is required comes closer each time the immobilizer is activated.

As a result of these considerations, the arrangement of the signal lines 7 was, for example, selected such that approximately the last third of the row is in the region of influence of the signal lines 7.

The position of a specific shopping cart within the row is subject to random fluctuations. Shopping carts are always taken from the end of the row and returned to the end of the row after use.

The respective end of the row between the time of removal of the shopping cart from the row and the time of return to the row fluctuates randomly.

As a result, a shopping cart is in a random position within the row when the store is closed for the day. A random selection is made from amongst all the shopping carts, after the store is closed for the day, in the region of influence of the signal lines 7.

As a result, the number of activation operations is distributed statistically over a broader base, which advantageously again results in an, on average, relatively long time period until the battery needs to be replaced.

In addition to the immobilizers which can be activated by electrical signals in a contact-free manner, immobilizers which can be activated by magnetic fields are also available.

In another refinement of the invention, provision is made for these magnetic fields to be generated by an electromagnet in the region of the entrance to the garage outside the opening times.

In this case, the region in which the magnetic fields can act on the shopping carts is selected such that said region corresponds substantially to the region of the influence of the signals transmitted by the signal lines 7.

In the case of immobilizers which can be activated by magnetic fields, the magnetic field causes only a small movement of a mechanical activation component in most cases, with the effect of the immobilizer being established only after a certain distance.

If these activation components are moved by the magnetic field of an electromagnet which is switched on outside store hours, the effect of the immobilizer is established immediately when the shopping cart is withdrawn.

If the shopping cart remains in the garage and the electromagnet is switched off again at the beginning of the opening time of the store, the activation component then returns to the inoperative position and the shopping cart can now be moved freely.

Immobilizers which can likewise be activated by magnetic fields are also available, and in the case of these immobilizers—in contrast to the last-mentioned immobilizers—the activation components do not return to the inoperative position when the magnetic field is canceled.

In the case of such immobilizers, switching on of the electromagnet would lead to the immobilizer being activated and also remaining activated when the electromagnet is switched off again.

For such immobilizers, provision is made, according to the invention, for the electromagnet to be located somewhat outside the garage and an immobilizer which is fitted to the shopping cart to be activated only when the shopping cart is actually removed from the garage outside of the opening times.

The result of this is that the immobilizer becomes active immediately when the shopping cart is removed from the garage outside store hours and in the immediate vicinity of the garage.

INDUSTRIAL APPLICABILITY

The invention is industrial applicable in a large number of stores which have fitted their shopping carts with an immobilizer.

The invention claimed is:

1. An immobilizer system for shopping carts, comprising:
    an element disposed on the shopping cart and for being activated by at least one of electromagnetic or magnetic fields, said element preventing movement of the shopping cart or at least increasing a difficulty of movement of the shopping cart;
    a perimeter transmission apparatus defining an area for protecting the shopping carts, said perimeter transmission element for activating said element;
    a transmission apparatus disposed within said area for protecting the shopping carts, said transmission apparatus for controlling the at least one of the electromagnetic or magnetic fields required to activate the element, said transmission apparatus including a further element for restricting transmission of the at least one of the electromagnetic or magnetic fields to a predetermined time period.

2. The immobilizer system according to claim 1, wherein said transmission apparatus disposed in the vicinity of an entrance to a garage in which the shopping carts are parked.

3. The immobilizer system according to claim 1, wherein said transmission apparatus is disposed in the vicinity of an entrance to a garage in which the shopping carts are parked, and a region of action of said transmission apparatus is outside and inside the garage.

4. The immobilizer system according to claim 1, wherein said transmission apparatus is disposed in the vicinity of an entrance to a garage in which the shopping carts are parked, and a region of action of said transmission apparatus is outside the garage.

5. The immobilizer system according to claim 1, wherein said transmission device restricts transmission of the at least one of the electromagnetic or magnetic fields by matching the predetermined times to opening times of a store.

6. The immobilizer system according to claim 2, wherein said transmission apparatus is disposed at said entrance of said garage.

7. The immobilizer system according to claim 6, wherein said transmission apparatus is disposed across said entrance of said garage.

* * * * *